121,827

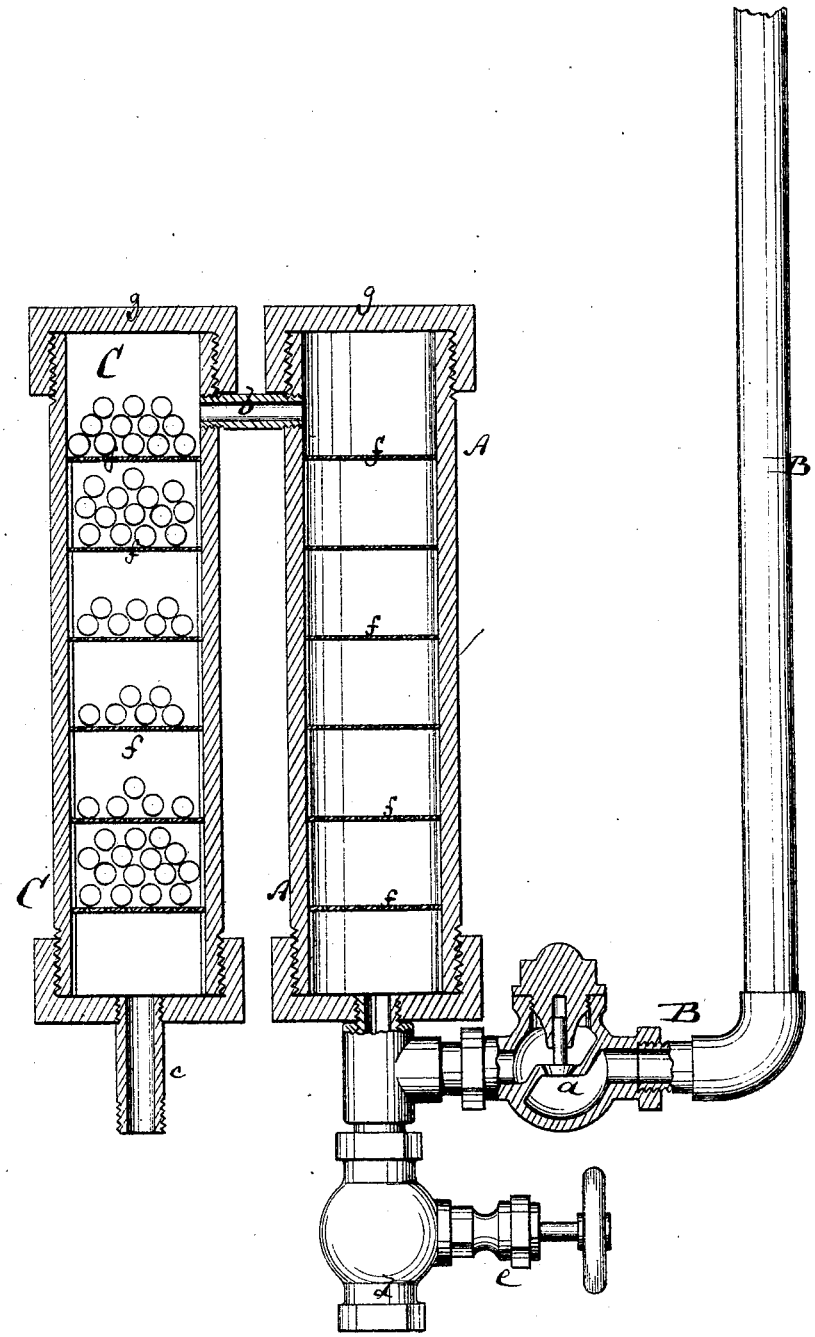

UNITED STATES PATENT OFFICE.

JOHN TUNBRIDGE, OF NEWARK, NEW JERSEY.

IMPROVEMENT IN APPARATUS FOR AMALGAMATING ORES.

Specification forming part of Letters Patent No. 121,827, dated December 12, 1871.

*To all whom it may concern:*

Be it known that I, JOHN TUNBRIDGE, of Newark, in the county of Essex and State of New Jersey, have invented an Improved Apparatus for Amalgamating Gold and Silver Ores; and I do hereby declare that the following is a full, clear, and exact description thereof, which will enable others skilled in the art to make and use the same, reference being had to the accompanying drawing forming part of this specification.

The invention will be first fully described and then clearly pointed out in the claim.

The drawing is a vertical section of the apparatus.

A C are two vessels connected by pipe $b$, and provided with screens $f$ at different altitudes. B is the ore-pipe, and $a$ its check-valve, connected with a vertical discharge-pipe, $d$, having cock $e$. The vessel A is filled to pipe $b$, or nearly so, with quicksilver, while balls of granulated amalgam, or some composition for the same purpose, are placed upon the sieves in chamber C.

The mode of operation is as follows: Power is employed in connection with pipe B to force the ore-washings therethrough, the valve $a$ opening inward and yielding to any force exerted through said pipe. The washings then pass up through the quicksilver in vessel A, and are subdivided in passing through screens $f$; they are then forced through the tube $b$ into vessel C, pass down through the amalgam balls and screens, and are discharged through pipe $c$.

The effect produced upon the ore is to abstract the principal part of the metal in chamber A and the greater portion of the residue while passing through the amalgam balls in chamber C.

Having thus described my invention, what I esteem to be new, and desire to secure by Letters Patent, is—

A mercury-chamber, A $f$, and an ore-supply pipe, B, connected with a forcing machine of some kind, combined with a vessel, C, provided with a series of screens covered with amalgam balls, as and for the purpose described.

JOHN TUNBRIDGE.

Witnesses:
 GEO. W. MABEE,
 T. B. MOSHER. (3)